United States Patent [19]

Clark

[11] Patent Number: 4,596,371

[45] Date of Patent: Jun. 24, 1986

[54] RECREATIONAL VEHICLE SUPPORT AND STABILIZING DEVICE

[76] Inventor: Burney E. Clark, 9648 52nd St., Riverside, Calif. 92509

[21] Appl. No.: 615,727

[22] Filed: May 31, 1984

[51] Int. Cl.⁴ .............................................. E04G 25/00
[52] U.S. Cl. ................... 248/354.3; 248/354.7
[58] Field of Search ............... 248/354.3, 354.1, 354.5, 248/354.7, 352, 188.5, 188.8; 280/763.1, 764.1, 765.1, 766.1; 296/169, 174, 167

[56] References Cited

U.S. PATENT DOCUMENTS

| | | | |
|---|---|---|---|
| 2,468,484 | 4/1949 | Clark | 248/354.3 |
| 2,703,691 | 3/1955 | Minnis | 248/188.5 |
| 2,979,304 | 4/1961 | Teel | 248/354.3 |
| 3,367,614 | 2/1968 | Leonard | 248/354.3 |
| 3,430,911 | 3/1969 | Olson | 248/354.3 |
| 3,480,247 | 11/1969 | Waner | 248/188.5 |
| 3,504,880 | 4/1970 | Toms | 248/354.3 |
| 3,606,231 | 9/1971 | Kilborn | 248/354.3 |
| 4,234,151 | 11/1980 | John et al. | 248/354.3 |

FOREIGN PATENT DOCUMENTS 2230442  7/1974  Fed. Rep. of Germany ... 280/763.1

Primary Examiner—Ramon S. Britts
Assistant Examiner—Ramon O. Ramirez
Attorney, Agent, or Firm—Pretty Schroeder Brueggemann & Clark

[57] ABSTRACT

A easily adjustable recreational vehicle support and stabilizing device, having two elongated legs each having a support means for engaging the frame of the vehicle and a support stand for engaging the ground, at least one of the legs being extensible longitudinally, and a restraining member releasably interconnecting the legs at their lower extremity having a plurality of links along its length so that the length of the restraining between the legs is inwardly or outwardly adjustable.

23 Claims, 4 Drawing Figures

RECREATIONAL VEHICLE SUPPORT AND STABILIZING DEVICE

FIELD OF THE INVENTION

This invention relates to a support and stabilizing device for use with stationary recreational vehicles.

BACKGROUND OF INVENTION

Recreational vehicles, including travel trailers, fifth wheelers, tent and camping trailers, pick-up campers, motorhomes and vans, traditionally contain a living space having sleeping and dining areas with cooking and bathing facilities being provided in larger models. To ensure stability, comfort and roadablity these vehicles are provided with a suspension system typically of either leaf or coil springs. The suspension system allows the wheel and axle assembly to move independently of the vehicle's frame with the springs functioning to cushion any impact of the tire with an uneven surface.

Although the suspension system provides roadability and comfort while the vehicle is moving, it is a main cause of discomfort while the vehicle is in stationary use. The ability of the frame of the vehicle to move independently of the axle allows the living space mounted on the frame to shift and sway from side to side in windy conditions or when the occupants move about.

In the past recreational vehicles have been provided with jacks or support stands which are attached to corners of the vehicle frame and extend perpendicularly to the ground when the vehicle is in stationary use. These devices, however, may require individual and often repeated adjustments to ensure that each jack is fully supportive of its respective corner. Furthermore these devices often do not adequately restrain the vehicle from side to side movement, primarily do to the ability of the vehicle frame to shift laterally without vertical movement of corresponding magnitude at the corners.

It is therefore an objective of the present invention to provide an easily adjustable, stabilizing device for recreational vehicles which inhibits lateral movement of the frame relative to the vehicle wheels and axle while the vehicle is stationary.

SUMMARY OF THE INVENTION

The present invention is an easily adjustable recreational vehicle support and stabilizing device that meets the above objective. It includes two elongated legs, at least one of which is extensible longitudinally. Each leg has a support means for engaging the frame of the vehicle above the suspension system and a support stand for engagement with the ground. The length of each leg is greater than the normal distance between the frame and ground such that the legs are downwardly diverging relative to each other.

The legs are interconnected at their lower extremity by a restraining member that provides tension between the legs to prevent them from separating and can be constructed of a coilable material, such as a chain, thereby rendering the device compact for storage when not in use. Each leg engages the vehicle and ground independently of the other. By inwardly or outwardly adjusting the length of the restraining member the device can be used on different vehicle types wherein the width varies from vehicle to vehicle.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 2:
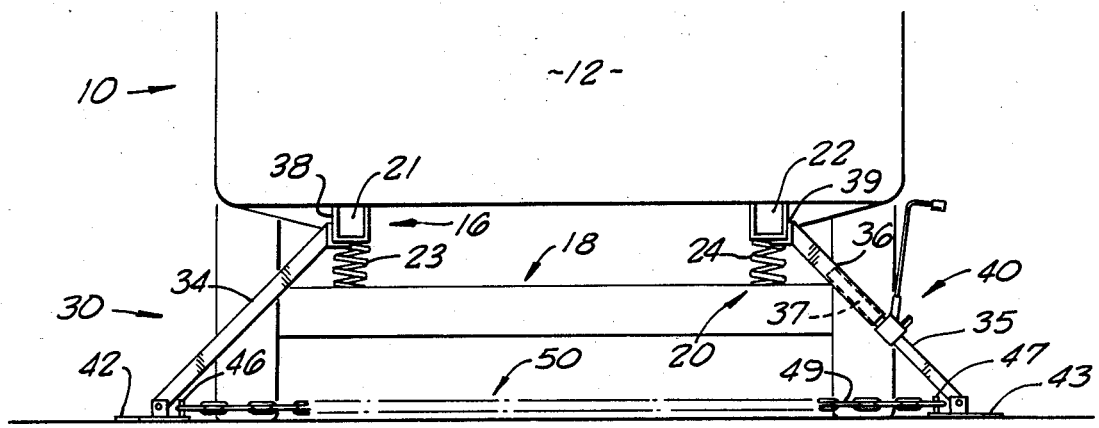
FIG. 2 is a front view of the support and stabilizing device engaging a recreational vehicle, the vehicle being shown in phantom lines.
Figure 3:
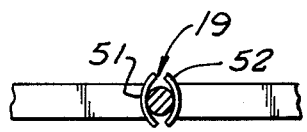
FIG. 3 is a fragmentary top view of the support bracket of the device for receiving the fifth wheel pin of a fifth wheel recreational trailer.
Figure 4:
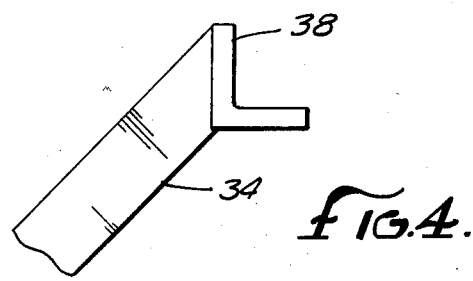
FIG. 4 is a fragmentary side view of the support bracket for receiving the frame of the vehicle.

An exemplary recreational vehicle 10, shown in FIG. 2, has a living space 12 supported by a frame 16 and axle 18, and suspension assembly 20 interconnecting frame and axle above the wheels.

The frame 16 is composed of two parallel longitudinal members 21 and 22 and parallel cross members (not shown). It is connected to the axle via the suspension assembly 20 which includes two coil springs 23 and 24. Compression of the springs permits the frame to move both vertically and independently of the axle and wheels providing comfort and roadability to the vehicle.

A support and stabilizing device 30 of the present invention is comprised of two elongated legs 34 and 35, each having an upper portion and a lower portion. The legs are mounted in a reverse lateral sense with respect to each other; that is to say, leg 34 is mounted for engagement with the ground on the opposite side of the vehicle frame from leg 35. The length of legs 34 and 35 is greater than the normal distance between the frame and the ground such that legs 34 and 35 are downwardly divergent relative to each other when the device is in use. The support and stabilizing device 30 can be mounted either in the front, or rear of the vehicle, or both.

At least one of the legs 35 is extensible and contractible along its length. In this embodiment the extensible leg 35 contains an upper portion 36 slidably enclosing a lower portion 37 of the leg. The upper portion 36 is connected to the lower portion 37 by means of a rachet jacket 40 which is manually operable to protract or retract the upper portion with respect to the lower portion thus making leg 35 telescope along its length.

The upper portion of the stabilizer legs 34 and 35 have support brackets 38 and 39 for receiving the frame members 21 and 22. Support brackets 38 and 39 engage the outside portion of the longitudinal frame members 21 and 22 to support the frame member both laterally and vertically. For engagement with the frame members of the type of vehicle depicted in FIG. 2, the support brackets are upwardly open having horizontal and vertical stays which support the frame member vertically and horizontally respectively.

Figure 1:
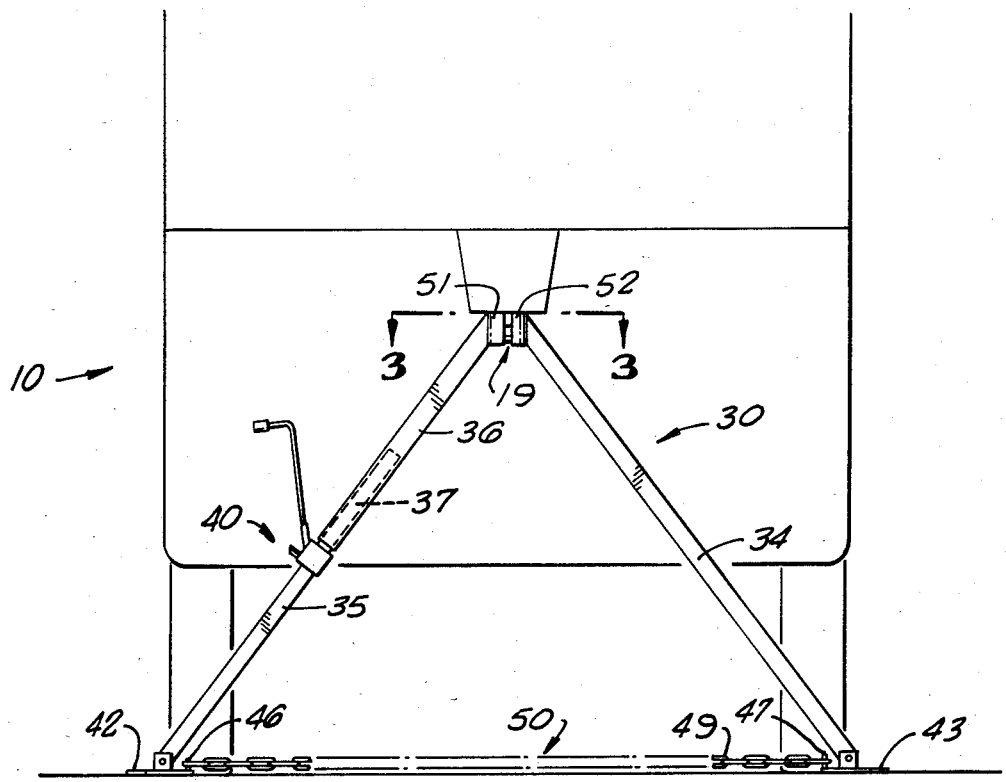
FIG. 1 is a front view of another embodiment of the support and stabilizing device engaging the fifth wheel pin of a fifth wheel recreational trailer.

For use of the support and stabilizing device 30 on fifth wheel vehicles of the type depicted in FIG. 1 legs 34 and 35 are provided with clevis support brackets 51 and 52 which engage the fifth wheel pin at the side of the pin providing horizontal support and at the pin housing providing vertical support.

Stands 42 and 43 are provided for engagement of legs 34 and 35 with the ground. The stands 42 and 43 are pivotally attached at the lower portion of the respective stabilizing legs. The stands contain a vertical stud 46 and 47 on their upper surface for engagement with restraining member 50. Restraining member 50 stops the stabilizer stand from sliding away as the stabilizing device is engaged to the vehicle frame. The restraining member 50 is releasably connected to stabilizing stands 42 and 43 thereby interconnecting the stabilizer legs at their lower extremity. As the function of the restraining member is to provide tension between the two legs, the restraining member can be constructed of any suitable coilable material such that the restraining member is able to be coiled while at the same time providing tensile strength. As illustrated in FIGS. 1 and 2 a suitable restraining member of the present invention can be a metal chain, although other materials such as a rope or cable may be employed. The coilable restraining member 50 allows the support and stabilizing device to be compacted for storage while not in use while at the same time providing requisite tensile strength for use.

The distance between the longitudinal frame members of recreational vehicles can vary from vehicle to vehicle. In order to accommodate vehicles of varying widths, legs 34 and 35 engage the frame and ground independently of each other and restraining member 50 contains a plurality of links 49 along its length for engagement with studs 46 and 47. The links 49 allow the length of the restraining member 50 between the two stabilizing legs 34 and 35 to be inwardly or outwardly adjustable thereby allowing the legs to engage the frame members which vary in distances from each other as the width of different vehicles varies.

The ability to adjust the length of the restraining member 50 further provides the support and stabilizing device 30 with the ability to function on different terrains. For example, it is possible to park the vehicle where the ground inclines upward or declines downward away from the vehicle. When this occurs the angle of divergence between the legs increases or decreases respectively thereby increasing or decreasing the distance between support foot 42 and foot 43 from each other. In order to restrain outward movement of foot 42 and 43 and provide the requisite tension, the length of the restraining member between the legs is increased or decreased accordingly.

In operation the extendible leg 35 is placed in position against the vehicle frame member 22 with the support bracket 30 engaging frame member 22 and with stabilizing foot 43 engaging the ground. The non-extendible leg 34 is placed in a reverse lateral position to leg 35 with support bracket 38 engaging frame member 21 and foot 43 engaging the ground. Restraining member 50 is attached to studs 46 and 47 and is adjusted to a length which is equal to the distance between the two stands. Leg 35 is then extended by means of rachet jack 40. As leg 35 extends it pushes up and against frame member 22 causing the frame 16 to securely engage the leg 35. The restraining member 50 prevents stabilizer stands 42 and 43 from sliding outwardly and away from each other which would cause the stabilizing device to disengage. The result is that both legs pinch the frame of the vehicle between them, thereby stabilizing the vehicle from both vertical and lateral movement. Further, as legs 34 and 35 and restraining number 50 are interconnected the stabilizing device 30 can be engaged to the vehicle and function without the need to make a number of independent adjustments on each leg.

In another embodiment of the present invention both legs 34 and 35 are made extensible along their respective lengths. As previously mentioned it is possible to park a recreational vehicle where the terrain either inclines upward or declines downward away from the vehicle frame. As the terrain so changes the angle of divergence increases or decreases respectively. For the device of the present invention to both support and stabilize the recreational vehicle, the angles of divergence should range between 60 degrees and 120 degrees with 90 degrees being most preferred. By extending or contracting both legs of the device the angle of divergence can be kept within the preferred range.

While a particular form of the invention has been illustrated and described, it will be apparent that various modifications can be made without departing from the spirit and scope of the invention.

I claim:

1. A recreational vehicle support and stabilizing device which inhibits vertical and lateral movement of the vehicle frame independently of the axle and wheels while the vehicle is in stationary use comprising:
   (a) two elongated legs having upper and lower portions, wherein the length of said legs is greater than the normal distance between the frame of said vehicle and the ground such that said legs are downwardly divergent relative to each other, at least one of said legs being extensible along its length, and each of said legs including a stand means connected to said portion for engagement with the ground;
   (b) support means mounted on said upper portion of each of said legs for engaging said frame;
   (c) a restraining member connecting said legs to each other, whereby said member can be held in tension between said legs, the length of said restraining member being adjustable; and
   (d) means for extending said extensible leg and thereby placing both of said legs in tension against said frame, the ground, and said restraining member.

2. The device of claim 1 wherein said means for extending said extensible leg is a rachet jack.

3. The device of claim 1 wherein the length of said restraining member between said legs is made outwardly or inwardly adjustable by means of interconnected links.

4. The device of claim 1 wherein said restraining member is coilable.

5. The device of claim 3 wherein said restraining member is a chain.

6. The device of claim 1 wherein both of said legs are extensible along their respective length.

7. The device of claim 1 wherein the upper portion of said extensible leg slidably encloses the lower portion of said leg.

8. The device of claim 1 wherein said extensible leg is telescopically extensible.

9. The device of claim 6 wherein both said legs are telescopically extensible.

10. A fifth wheel recreational trailer support and stabilizing device which inhibits vertical and lateral movement of the vehicle frame independent of the vehicle axle and wheels while the vehicle is in stationary use comprising:

(a) two elongated legs having upper and lower portions wherein the length of said legs is greater than the normal distance between the frame of said vehicle and the ground such that said legs are downwardly divergent relative to each other, at least one of said legs being extensible along its length, and each of said legs including a stand means connected to said lower portion for engagement with the ground;

(b) support means mounted on said upper portion of each of said elongated legs for engagement with the fifth wheel pin housing of said vehicle;

(c) a restraining member connecting said legs to each other, whereby said member can be held in tension between said legs, the length of said restraining member being adjustable; and (d) means for extending said extensible leg and thereby placing both of said legs in tension against said housing, the ground, and said restraining member.

11. The device of claim 10 wherein said support means is a clevis support.

12. The device of claim 10 wherein said means for extending said extensible leg is a rachet jack.

13. The device of claim 10 wherein the length of said restraining member between said legs is made outwardly or inwardly adjustable by means of interconnected links.

14. The device of claim 10 wherein said restraining member is coilable.

15. The device of claim 10 wherein said restraining member is a chain.

16. The device of claim 10 wherein both of said legs are extensible along their respective length.

17. The device of claim 10 wherein the upper portion of said extensible leg slidably encloses the lower portion of said leg.

18. The device of claim 10 wherein said extensible leg is telescopically extensible.

19. The device of claim 10 wherein both said legs are telescopically extensible.

20. The device of claim 10 wherein said means for extending said extensible leg is a rachet jack.

21. A recreational vehicle support and stabilizing device which inhibits vertical and lateral movement of the vehicle frame independent of the vehicle axle while the vehicle is in stationary use comprising:

(a) two elongated legs having upper and lower portions, where the length of said legs is greater than the distance between the frame of said vehicle and the ground such that said legs are downwardly divergent relative to each other, the upper portion of at least one of said legs slidably enclosing the lower portion of said leg making said leg telescopically extensible, and each of said legs including a stand means pivotably connected to said lower portion for engagement with the ground;

(b) support means mounted on said upper portion of each of said elongated legs for engagement with said vehicle;

(c) a coilable restraining member releasably connecting said legs to each other, whereby said member can be held in tension between said legs, the length of said restraining member between said legs being outwardly or inwardly adjustable by means of a plurality of interconnected links; and (d) means for extending said extensible leg and thereby tensioning said elongated legs againts said frame, the ground, and said restraining member.

22. A method for stabilizing a recreational vehicle while the vehicle is in stationary use comprising the steps of:

(a) positioning two elongated legs having upper and lower portions, at least one of said legs being extensible, in a reverse lateral sense to each other adjacent to the vehicle frame, whereby said legs are downwardly divergent relative to the other;

(b) causing the upper portion of each leg to engage said vehicle by a support means mounted on the upper portion of said elongated legs;

(c) causing the lower portion of each leg to engage the ground by means of a stand means pivotably connected to said lower portion of each of said legs;

(d) connecting said legs to each other by a restraining member; and (e) extending said extensible leg and thereby tensioning said legs against said frame, the ground, and said restraining member.

23. A method for stabilizing a fifth wheel recreational vehicle while the vehicle is in stationary use comprising the steps of:

(a) positioning two elongated legs having upper and lower portions, at least one of said legs being extensible, in a reverse lateral sense to each other adjacent to the fifth wheel pin housing of said vehicle, said legs are positioned so that the distance between the frame of said vehicle and the ground is such that the legs are downwardly divergent relative to each other;

(b) causing the upper portion of each leg to engage the fifth wheel pin housing by a support means mounted on the upper portion of said legs;

(c) causing the lower portion of each leg to engage the ground by a stand means pivotably connected to said lower portion of said legs;

(d) connecting said legs to each other by a restraining member; and (e) extending said extensible leg and thereby tensioning both legs between the fifth wheel pin housing, the ground, and said restraining member.

* * * * *

UNITED STATES PATENT AND TRADEMARK OFFICE
CERTIFICATE OF CORRECTION

PATENT NO. : 4,596,371

DATED : June 24, 1986

INVENTOR(S) : Burney E. Clark

It is certified that error appears in the above-identified patent and that said Letters Patent is hereby corrected as shown below:

In column 1, line 38 delete "do" and insert therefor -- due --.

In column 3, line 68, delete "number" and insert therefor -- member --.

Signed and Sealed this

Twenty-first Day of October, 1986

[SEAL]

Attest:

DONALD J. QUIGG

*Attesting Officer*  *Commissioner of Patents and Trademarks*